June 10, 1930.  W. L. HANCOCK  1,762,473
PIN AND MOUNTING THEREFOR
Filed March 25, 1929
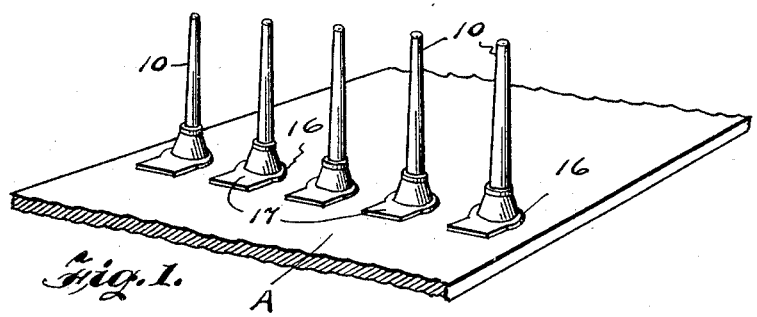
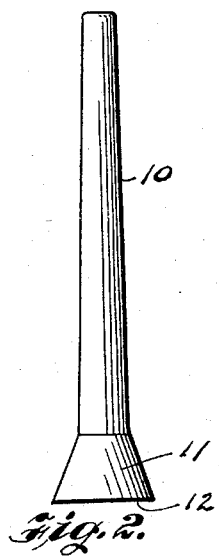
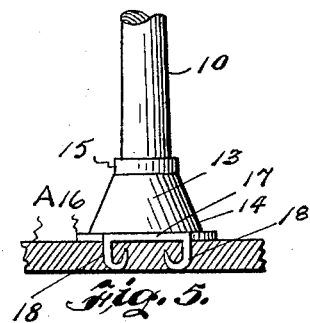
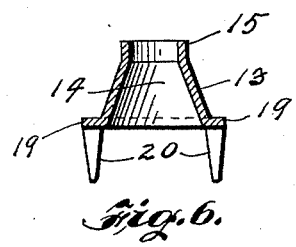
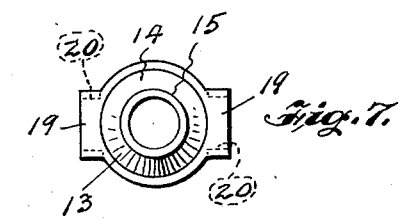
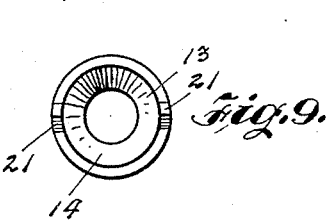
INVENTOR
W. L. Hancock
BY
ATTORNEY Patented June 10, 1930

1,762,473

UNITED STATES PATENT OFFICE

WILLIAM L. HANCOCK, OF DALLAS, TEXAS, ASSIGNOR TO THE MURRAY COMPANY, OF DALLAS, TEXAS, A CORPORATION OF TEXAS

PIN AND MOUNTING THEREFOR

Application filed March 25, 1929. Serial No. 349,535.

This invention relates to new and useful improvements in pins and mountings therefor.

The invention has particularly to do with pins such as are used on conveyor belts and the like.

One object of the invention is to provide a pin particularly adapted for use with a drag conveyor, such as a belt distributor for cotton gins, whereby the bottom of the distributor housing may be made of metal without fire hazard owing to the formation of the pin of non-metallic material.

An important object of the invention is to provide a mounting for the pin whereby it may be secured to a belt in a simple and effective manner and without the use of rivets or sizable studs which make holes in the belt and greatly weaken the belt when the pins are mounted in rows transversely of the belt.

A further object of the invention is to provide a pin mounting for a belt which will eliminate washers and obtrusive projections from the underside of the belt and which also may be quickly, easily and effectively fastened on the belt.

Another object of the invention is to provide a mounting separate from the pin and in which the pin may be fastened, whereby the mounting may be made of one material, as metal, and the pin may be made of a different material, as rubberized fabric, fibre, wood or any non-metallic substance suitable for the purpose.

A still further object of the invention is to construct a separate pin with a head and drive the pin into a socket on the mounting, whereby a firm connection and a substantial support for the pin is provided and also whereby the assembling operation is simplified.

Further reference will be made herein to the foregoing and other features of the invention, which will be more particularly pointed out.

In the following specification an exemplification of the invention is set forth and this is illustrated in the accompanying drawings in which:
Fig. 1 is a perspective view showing a portion of a belt having fingers mounted thereon in accordance with the invention, Fig. 2 is an elevation of one of the pins, Fig. 3 is an assembled view showing the pin in elevation secured in the mounting which is shown in section, Fig. 4 is a plan view of the mounting, Fig. 5 is a view at right angles to Fig. 3 and showing the mounting fastened on a belt, Fig. 6 is a view similar to Fig. 3 showing another form of mounting, Fig. 7 is a plan view of the mounting shown in Fig. 6, Fig. 8 is a detail of still another form of mounting, and

Fig. 9 is an underside view of the same.

In the drawings the numeral 10 designates a tapered pin which is preferably made of a non-metallic material, such as rubber, rubberized fabric, wood, fibre or any other material suitable for the purpose. The pin has a frusto-conical head 11 from which the body or shank of the pin tapers. The head has a flat end 12 which forms an amplified base or support for the pin on the belt.

For securing the pin to the belt a mounting 13 is provided and this mounting includes a socket comprising a thimble 14 and a collar 15. The thimble is frusto-conical in shape and is tapered to fit the head 11 which is driven therein so as to be firmly held in the mounting. The head is of such length that its flat base 12 will be flush with the bottom edge of the thimble.

The collar 15 embraces the shank of the pin and extends above the intersection between the head and the shank so as to more securely hold the pin in place. The collar eliminates a sharp edge at the upper end of the thimble which would have a tendency to cut the shank when the pin was bent to one side.

There are several methods of securing the thimble to a belt. While it is possible to secure the mounting to a leather belt the largest use will be with fabric belts. In Figs. 1, 3, 4 and 5 the thimble has an annular base flange 16. From one side of this flange a horizontal lug 17 extends in the plane of the flange.

Prongs 18 are bent downwardly from each side of the lug. The mounting may all be made from one piece by cutting it from a metal sheet and pressing or spinning the thimble 15 and collar 16 therefrom and then bending down the prongs 18. When the pin and mounting are placed on the belt A, as is shown in Figs. 1 and 5, the base 12 will rest upon the face of the belt, whereby the pin will have a firm support.

By pushing the prongs 18 through the belt and upsetting their ends, as is shown in Fig. 5, the mounting 13 is adequately fastened on the belt and the under face of said belt is left free from projections or obstrusive fastenings such as washers and rivet heads. The prongs being sharp and comparatively thin will penetrate a fabric belt without making holes like a rivet and thus the belt is not weakened to any great extent by placing a number of mountings in a row transversely of the belt, as in Fig. 1.

Tests have shown that these mountings are not as easily torn from the belt as where the mounting is held by a single rivet. Further the pin 10 is firmly held on the belt and severe usage does not loosen it in any way. When a non-metallic pin is employed its end may be moved along a metal surface without injury to the surface or danger of fire, which makes it highly desirable for use with belt distributors for cotton gins.

Another form of mounting is shown in Figs. 6 and 7, where the base flange 16 is provided with diametrically opposite lugs 19. These lugs are shorter than the lug 17 and have prongs 20 bent downwardly from each. This mounting is secured by pushing the prongs through the belt and upsetting their ends the same as the prongs 18. By fastening the thimble on diametrically opposite sides it is more securely held on the belt.

One of the many other ways of fastening the mounting on a belt or other carrier is shown in Figs. 8 and 9. Here the base flange 16 is omitted and prongs 21 extend from the bottom edge of the thimble 16. This particular mounting could be made from a tube, as is obvious.

Various changes in the size and shape of the different parts, as well as modifications and alterations, may be made within the scope of the appended claims.

What I claim, is:

1. The combination with a distributor belt, of a non-metallic material-engaging pin, a separate metallic mountings by which the pin is secured, and means upon the mounting and extending through the belt for fastening the mounting thereto.

2. The combination with a distributor belt, of a non-metallic material-engaging pin, a separate metallic mounting within which the pin is secured, and integral means upon the mounting and extending through the belt for fastening the mounting thereto.

3. The combination with a distributor belt, of a material engaging pin having an enlarged head, a separate mounting in which said head is seated in contact with the belt, and means bent from the mounting and extending through the belt for fastening the mounting thereto.

4. The combination with a distributor belt, of a non-metallic material-engaging pin having a shank and enlarged head, a separate metallic mounting including a thimble surrounding the head and a collar fitting the pin shank, and means for securing the thimble to said belt.

5. The combination with a distributor belt, of a belt pin mounting including a thimble and a collar carried by the thimble, a material-engaging pin having a head fitting in the thimble and a shank extending through the collar, and prongs carried by the thimble and extended through the belt for securing the thimble thereto.

6. The combination with a distributor belt, of a belt pin mounting including a frusto-conical thimble and a circular collar on the smaller end of the thimble, a material engaging pin having a frusto-conical head seated on a flat surface of the belt and tightly fitting the thimble with its shank extending through the collar, and fastening elements carried by the larger end of the thimble.

7. The combination with a distributor belt, of a material-engaging pin having an enlarged head adapted to rest upon a flat surface of the belt, and mounting embracing said head and having a radial extension to contact with the belt surface and provided with securing means adapted to penetrate said belt.

8. The combination with a distributor belt, of a non-metallic material-engaging pin adapted to seat upon a flat surface of the belt, and separate securing means at the base of the pin entering said belt without projection beyond the face of the belt opposite that upon which the pin is seated.

9. As a new article of manufacture, a distributor belt having a plurality of non-metallic material-engaging pins, each pin having a head and also provided with an extremely smooth surface tapered toward its outer end for readily shreading cotton therefrom, and metallic means engaging the head of each pin for fastening it to the belt.

10. The combination with a distributor belt, of a plurality of material-engaging pins having enlarged ends seated in contact with said belt, and a separate mounting for each pin embracing its enlarged end and resting upon the flat face of the belt, and means for securing said mounting and belt in contact.

In testimony whereof I affix my signature.

WILLIAM L. HANCOCK.